(12) United States Patent
Yang et al.

(10) Patent No.: US 9,684,399 B2
(45) Date of Patent: Jun. 20, 2017

(54) TOUCH ELEMENT AND MANUFACTURING METHOD THEREOF, AND TOUCH SCREEN

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiuxia Yang, Beijing (CN); Feng Bai, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/803,719

(22) Filed: Jul. 20, 2015

(65) Prior Publication Data

US 2016/0216818 A1 Jul. 28, 2016

(30) Foreign Application Priority Data

Jan. 27, 2015 (CN) .......................... 2015 1 0040079

(51) Int. Cl.
*G06F 3/041* (2006.01)
*B82Y 30/00* (2011.01)
*B82Y 40/00* (2011.01)

(52) U.S. Cl.
CPC .............. *G06F 3/041* (2013.01); *B82Y 30/00* (2013.01); *B82Y 40/00* (2013.01); *G06F 2203/04103* (2013.01)

(58) Field of Classification Search
CPC ....... G06F 3/041–3/0414; G06F 3/044–3/047; G06F 2203/04103; G06F 2203/04112;
(Continued)

(56) References Cited

U.S. PATENT DOCUMENTS

2008/0290787 A1* 11/2008 Cok .................... H01L 51/5203
313/503
2009/0101488 A1 4/2009 Jiang et al.
(Continued)

FOREIGN PATENT DOCUMENTS

CN 101165883 A 4/2008
CN 101508432 A 8/2009
(Continued)

OTHER PUBLICATIONS

First OA issued Mar. 25, 2016, of CN counterpart application No. 201510040079.5, with full English translation.
(Continued)

*Primary Examiner* — Nathan Danielsen
(74) *Attorney, Agent, or Firm* — Nath, Goldberg & Meyer; Joshua B. Goldberg; Christopher Thomas

(57) ABSTRACT

The present invention provides a touch element and a manufacturing method thereof, and a touch screen. The touch element includes a substrate and a touch layer arranged on the substrate, the touch layer is made of a doped carbon nanotube material, and the doped carbon nanotube material is formed by doping and modifying a carbon nanotube material with a strong oxidizing material. The touch element has higher conductivity and lower sheet resistance, which makes the touch element have a good touch performance, thus making a touch product with the touch element achieve the same touch performance while reducing the cost of the touch product; at the same time, the touch layer made of the doped carbon nanotube material has good characteristics of bending resistance, scratch resistance and knocking resistance, so that the touch element can be well applied to the touch of a flexible display product.

6 Claims, 1 Drawing Sheet

(58) Field of Classification Search
CPC ........... G06F 2203/04113; B82Y 99/00; C01B 31/02; C01B 31/0206; C01B 31/022–31/0286; C01B 2202/00–2202/36
See application file for complete search history.

(56) References Cited

U.S. PATENT DOCUMENTS

| | | | | |
|---|---|---|---|---|
| 2011/0214728 A1* | 9/2011 | Veerasamy | ............. | G06F 3/045 345/174 |
| 2012/0319976 A1* | 12/2012 | Ahn | ......... | G06F 3/045 345/173 |
| 2015/0010749 A1* | 1/2015 | Oi | ............. | G06F 3/041 428/329 |

FOREIGN PATENT DOCUMENTS

| | | | | | |
|---|---|---|---|---|---|
| CN | 101620492 | A | 1/2010 | | |
| CN | 102142520 | A | 8/2011 | | |
| CN | 102880369 | A | 1/2013 | | |
| CN | 103345963 | A | 10/2013 | | |
| JP | WO 2013115123 | A1 * | 8/2013 | ............. | G06F 3/041 |
| WO | 2013047341 | A1 | 4/2013 | | |

OTHER PUBLICATIONS

Office Action dated Aug. 17, 2016 issued in corresponding Chinese Application No. 201510040079.5.
Third Office Action dated Jan. 18, 2017 in corresponding Chinese Application No. 201510040079.5.

* cited by examiner

TOUCH ELEMENT AND MANUFACTURING METHOD THEREOF, AND TOUCH SCREEN

FIELD OF THE INVENTION

The present invention relates to the field of display technology, and particularly to a touch element and a manufacturing method thereof, and a touch screen.

BACKGROUND OF THE INVENTION

With the rapid development of display technology, a flexible touch display product has become the development direction in the display field, and in particular, a wearable touch apparatus has become the mainstream of development trends.

In the prior art, the transparent conductive material (for example, ITO), a metal mesh and the like are usually used to prepare a touch element in the touch display product. Since the touch element made of the above material has bad mechanical strength and flexibility, the touch element cannot be well used in a flexible display product. At the same time, the touch element made of the above material has lower conductivity and higher sheet resistance, and thus in order to ensure the flexible touch display product with a good performance, the manufacturing cost of the flexible touch display product will be inevitably increased.

In addition, the touch element made of the above material usually can only be arranged in the display region of the display product, and when the touch element is touched, the display region is usually lighted, which will increase power consumption of the flexible touch display product to a certain extent.

SUMMARY OF THE INVENTION

In view of the above technical problem existing in the prior art, the present invention provides a touch element, a manufacturing method thereof and a touch screen. The touch element includes a substrate and a touch layer arranged on the substrate, the touch layer is made of a doped carbon nanotube material, and the doped carbon nanotube material is formed by doping and modifying a carbon nanotube material with a strong oxidizing material. The touch element has higher conductivity and lower sheet resistance, which makes the touch element have a good touch performance, thus making a touch product with the touch element achieve the same touch performance while reducing the cost of the touch product; at the same time, the touch layer made of the doped carbon nanotube material has good characteristics of bending resistance, scratch resistance and knocking resistance, so that the touch element can be well applied to the touch of a flexible display product.

The present invention provides a touch element, including a substrate and a touch layer arranged on the substrate, wherein the touch layer is made of a doped carbon nanotube material, and the doped carbon nanotube material is formed by doping and modifying a carbon nanotube material with a strong oxidizing material.

The strong oxidizing material may include nitrogen dioxide, bromine, nitric acid or thionyl chloride.

The touch element may further include a protection layer arranged on a surface of the touch layer far away from the substrate.

The protection layer may be made of one or more of a polymer mixture of poly 3,4-Ethylenedioxythiophene and Polystyrene sulfonate, poly(p-phenyl vinyl), Polythiophene, Polysilane, Triphenylmethane, Triarylamine, and Pyrazoline.

The present invention further provides a touch screen, including at least one touch element mentioned above.

The touch screen may further include a display panel, wherein the touch element is arranged on an outer surface of the display panel; or the touch element is arranged inside the display panel.

The at least one touch element is uniformly distributed on any outer surface of the display panel except the display surface, and the any outer surface of the display panel except the display surface functions as the substrate of the touch element; or the at least one touch element is uniformly distributed on any layer inside the display panel, and the any layer functions as the substrate of the touch element.

The present invention further provides a manufacturing method of a touch element, including: step S1, forming a touch layer on a substrate.

Step S1 may include: step S11, forming a carbon nanotube film layer on the substrate; step S12, doping and modifying the carbon nanotube film layer; and step S13, patterning the resultant carbon nanotube film layer. Alternatively, step S1 may include: step S11, forming a carbon nanotube film layer on the substrate; step S13, patterning the carbon nanotube film layer; and step S12, doping and modifying the resultant carbon nanotube film layer.

Step S11 may include: coating carbon nanotube dispersion on the substrate, and then drying the carbon nanotube dispersion by a drying process to form the carbon nanotube film layer; or first coating a curing material on the substrate, then preparing a carbon nanotube material on the curing material using a drawing film process, and finally curing the carbon nanotube material by a curing process corresponding to properties of the curing material to form the carbon nanotube film layer.

Step S12 may include: placing the substrate subjected to step S11 in an environment of a strong oxidizing material, and doping and modifying the carbon nanotube film layer for a preset period of time at a preset temperature. The strong oxidizing material includes nitrogen dioxide, bromine, nitric acid or thionyl chloride.

A laser ablation process may be used to pattern the carbon nanotube film layer. After any of step S11, step S12, and step S13, the manufacturing method further includes: cleaning the substrate and then drying the substrate.

After step S12 or step S13, the manufacturing method further includes: step S2, forming a protection layer.

Step S2 may include: coating a material of the protection layer on the substrate subjected to step S12 or step S13 to form a protection layer film, then curing the protection layer film, and patterning the protection layer film to form the protection layer.

A single laser ablation process may be used for patterning the protection layer and patterning the carbon nanotube film layer.

The material of the protection layer may include one or more of a polymer mixture of poly 3,4-Ethylenedioxythiophene and Polystyrene sulfonate, poly(p-phenyl vinyl), Polythiophene, Polysilane, Triphenylmethane, Triarylamine, and Pyrazoline.

Advantages of the present invention are as follows: in the touch element provided by the present invention, the touch layer made of the doped carbon nanotube material has higher conductivity and lower sheet resistance than the touch layer made of a conventional material, which makes the touch element have a good touch performance, thus making a touch product with the touch element achieve the same touch performance while reducing the cost of the touch product. At the same time, the touch layer made of the doped carbon nanotube material has good characteristics of bending resistance, scratch resistance and knocking resistance, so that the touch element can be well applied to the touch of a flexible display product.

The touch screen provided by the present invention adopts the above touch element, and thus not only can reduce cost and power consumption of the touch screen, but also can achieve edge touch.

DETAILED DESCRIPTION OF THE EMBODIMENTS

A touch element, a manufacturing method thereof, and a touch screen provided by the present invention will be further described below in conjunction with the accompanying drawings and embodiments, in order to make a person skilled in the art better understand the technical solutions of the present invention.

Embodiment 1

Figure 1:
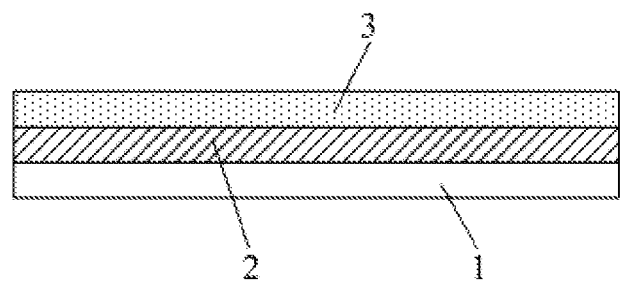
FIG. 1 is a cross-sectional view of a structure of a touch element in a first embodiment of the present invention.

As illustrated in FIG. 1, the embodiment provides a touch element, which includes a substrate 1 and a touch layer 2 arranged on the substrate 1, the touch layer 2 is made of a doped carbon nanotube material, and the doped carbon nanotube material is formed by doping and modifying a carbon nanotube material with a strong oxidizing material.

The doped carbon nanotube material having been doped and modified with the strong oxidizing material may have a conductivity up to 12000 s/cm~90000 s/cm, and have a sheet resistance up to 10 Ω/□.

The touch layer 2 made of the doped carbon nanotube material has higher conductivity and lower sheet resistance than the touch layer made of a conventional material, which makes the touch element have a good touch performance, thus making a touch product with the touch element achieve the same touch performance while reducing the cost of the touch product. At the same time, the touch layer 2 made of the doped carbon nanotube material has good characteristics of bending resistance, scratch resistance and knocking resistance, so that the touch element can be well applied to the touch of a flexible display product.

In this embodiment, the strong oxidizing material includes nitrogen dioxide, bromine, nitric acid or thionyl chloride. Of course, the strong oxidizing material is not limited to these materials.

In this embodiment, the touch element further includes a protection layer 3, which is arranged on a surface of the touch layer 2 far away from the substrate 1. The protection layer 3 is arranged to make the electric performance of the touch layer 3 more stable, and have better chemical resistance and weather resistance, and thus the long-term stability of the touch element can be realized.

In this embodiment, the protection layer is made of one or more of a polymer mixture of poly 3,4-Ethylenedioxythiophene and Polystyrene sulfonate, poly(p-phenyl vinyl), Polythiophene, Polysilane, Triphenylmethane, Triarylamine, and Pyrazoline. All these materials are highly conductive materials, which can make the electric performance of the touch layer 2 more stable. Of course, the material of the protection layer 3 is not limited to the above.

Based on the above configuration of the touch element in this embodiment, this embodiment further provides a manufacturing method of the touch element, including steps of:

Step S1: forming a touch layer 2 on a substrate 1.

This step may particularly include the following steps S11, S12 and S13.

Step S11: forming a carbon nanotube film layer on the substrate 1.

Step S11 may particularly include: coating carbon nanotube dispersion on the substrate 1, and then drying the carbon nanotube dispersion by a drying process to form the carbon nanotube film layer. The carbon nanotube dispersion is formed by dispersing the carbon nanotube material into organic solvent, inorganic solvent or dispersant.

Alternatively, another method may be used to form the carbon nanotube film layer on the substrate 1: first coating a curing material on the substrate 1, then preparing a carbon nanotube material on the curing material using a drawing film process, and finally curing the carbon nanotube material by a curing process corresponding to properties of the curing material to form the carbon nanotube film layer. Since the carbon nanotube material itself has tensile property, this method can be used to form he carbon nanotube film layer on the substrate 1.

After step S11, the substrate 1 is cleaned with cleaning agent, and then is dried after being cleaned. This step of cleaning can wash off dirt on the substrate 1 subjected to step S11, so as to facilitate the subsequent process.

Step S12: doping and modifying the carbon nanotube film layer.

In this step, the substrate subjected to step S11 is placed in an environment of a strong oxidizing material, so as to dope and modify the carbon nanotube film layer for a preset period of time at a preset temperature. The strong oxidizing material includes nitrogen dioxide, bromine, nitric acid, thionyl chloride or the like.

For example, the substrate 1 subjected to step S11 may be placed in a nitric acid solution, and kept therein for 5~30 minutes at room temperature. Alternatively, the substrate 1 subjected to step S11 may be sprayed with nitric acid for 5~30 minutes at room temperature. Then, the substrate 1 subjected to the nitric acid treatment may be cleaned with deionized water, and dried with an air knife, so as to facilitate the subsequent process.

Step S13: patterning the carbon nanotube film layer.

In this step, a laser ablation process is used for patterning the carbon nanotube film layer. The laser ablation process can retain the desired part of the carbon nanotube film layer, and remove the undesired part of the carbon nanotube film layer, so as to finally form the pattern of the touch layer 2. The patterned touch layer 2 can better realize the touch function.

Similarly, after step S13, the substrate 1 is cleaned with cleaning agent, and then is dried, so as to facilitate the subsequent process.

It should be pointed out that, in this embodiment, sequence of step S12 and S13 may be changed, that is, the carbon nanotube film layer may be first patterned, and the patterned carbon nanotube film layer is then doped and modified, which will have no influence on the resultant touch layer 2.

In this embodiment, after step S13, the manufacturing method further includes: forming a protection layer 3.

This step particularly includes: coating a material of the protection layer on the substrate 1 subjected to step S13 to form a protection layer film, then curing the protection layer film, and patterning the protection layer film to form the protection layer 3. The material of the protection layer 3 includes one or more of a polymer mixture of poly 3,4-Ethylenedioxythiophene and Polystyrene sulfonate, poly(p-phenyl vinyl), Polythiophene, Polysilane, Triphenylmethane, Triarylamine, and Pyrazoline.

In this step, a laser ablation process or a process including exposure, development and etching is used to pattern the protection layer film.

Until now, the touch element is prepared completely.

Embodiment 2

This embodiment provides a manufacturing method of a touch element, which is different from that in the embodiment 1 in that: after step S12, the manufacturing method further includes step S2: forming a protection layer. That is, the protection layer is formed after the carbon nanotube film layer is doped and modified, and the substrate with the prepared protection layer is then cleaned with cleaning agent and dried. After this, step S13 is executed to pattern the carbon nanotube film layer.

It should be pointed out that, in this embodiment, a single laser ablation process may be used to pattern the protection layer and the carbon nanotube film layer simultaneously, which will save one patterning process compared with the embodiment 1.

Other steps in the manufacturing method of a touch element in this embodiment are the same as those in the embodiment 1, and will be omitted herein.

Advantages of the embodiments 1 and 2 are as follows: in the touch element in the embodiment 1 or 2, the touch layer made of the doped carbon nanotube material has higher conductivity and lower sheet resistance than the touch layer made of a conventional material, which makes the touch element have a good touch performance, thus making a touch product with the touch element achieve the same touch performance while reducing the cost of the touch product. At the same time, the touch layer made of the doped carbon nanotube material has good characteristics of bending resistance, scratch resistance and knocking resistance, so that the touch element can be well applied to the touch of a flexible display product.

Embodiment 3

Figure 2:
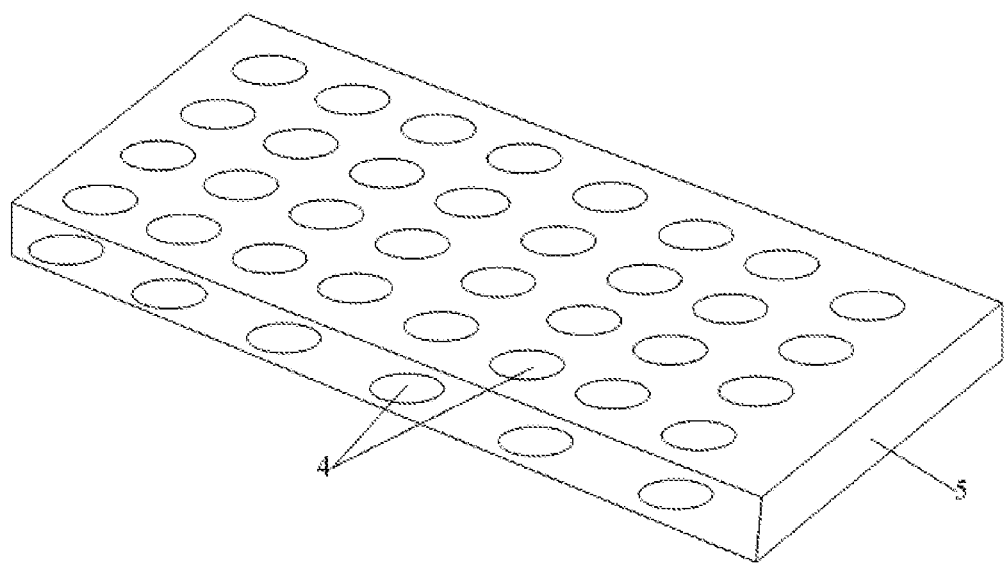
FIG. 2 is a schematic view illustrating a distribution of touch elements on a touch screen in a third embodiment of the present invention.

As shown in FIG. 2, this embodiment provides a touch screen, which includes at least one touch element 4 in the embodiment 1 or 2.

In this embodiment, the touch screen further includes a display panel 5, and the at least one touch element 4 is arranged on an outer surface of the display panel 5. That is, the touch element 4 may be arranged on the display surface, the back surface, or any side of the display panel 5, which makes the arrangement of the touch element 4 on the display panel 5 more flexible, thus enabling the touch screen to achieve edge touch.

In addition, when the touch element 4 arranged on the outer surface of the display panel 5 is touched, certain instruction operations of the display panel 5 can be completed without lighting the display panel 5. For example, when the touch element 4 arranged on one side of the display panel 5 is used to control ON/OFF of the audio source of the display panel 5, as long as a hand touches the touch element 4, the audio source may be turned on or off, but the display panel 5 is not lit during the touch procedure. This can save power consumption of the display panel 5, and thus reduce the power consumption of the touch screen.

In this embodiment, the at least one touch element 4 is uniformly distributed on any outer surface of the display panel 5 except the display surface, which functions as the substrate of the touch element. That is, the touch layer of the touch element 4 is directly formed on any outer surface of the display panel 5 except the display panel. With such a configuration, the display region of the display panel 5 will not be occupied, thus avoiding the decrease of the area of the display region, and then the normal display of the touch screen is not influenced by the arrangement of the touch element 4.

It should be pointed out that, the at least one touch element 4 may be arranged inside the display panel 5. Preferably, the at least one touch element 4 is uniformly distributed on any layer inside the display panel 5, which functions as the substrate of the touch element 4. That is, the touch layer in the touch element 4 is directly formed on any layer inside the display panel 5.

The touch screen in this embodiment may be an On-cell touch screen in which the touch element is embedded between the color filter substrate and the polarizer of the display panel, an In-cell touch screen in which the touch element is embedded inside the display panel, an Out-cell touch screen (i.e. the external touch screen), or an OGS touch screen in which the touch element is integrated with the protective glass.

The touch screen provided by this embodiment adopts the touch element in the embodiment 1 or 2, and thus not only can reduce the cost and power consumption of the touch screen, but also can make the touch screen achieve edge touch.

It may be understood that, the foregoing embodiments are merely exemplary embodiments employed for illustration of the principle of the present invention, and the present invention is not limited thereto. For a person of ordinary skill in the art, various variations and improvements may be made without departing from the spirit and essence of the present invention, and these variations and improvements shall be regarded as falling into the protection scope of the present invention.

The invention claimed is:

1. A manufacturing method of a touch element, including: step S1, forming a touch layer on a substrate, wherein the touch layer is made of a doped carbon nanotube material, and the doped carbon nanotube material is formed by doping and modifying a carbon nanotube material with a strong oxidizing material;

wherein step S1 includes: step S11, forming a carbon nanotube film layer on the substrate; step S12, doping and modifying the carbon nanotube film layer; and step S13, patterning the resultant carbon nanotube film layer; or step S1 includes: step S11, forming a carbon nanotube film layer on the substrate; step S13, patterning the carbon nanotube film layer; and step S12, doping and modifying the resultant carbon nanotube film layer;

wherein after step S12 or S13, the manufacturing method further includes: step S2, forming a protection layer;

wherein step S2 includes: coating a material of the protection layer on the substrate subjected to step S12 or step S13 to form a protection layer film, then curing the protection layer film, and patterning the protection layer film to form the protection layer; and wherein a single laser ablation process is used for patterning the protection layer and patterning the carbon nanotube film layer.

2. The manufacturing method of claim 1, wherein step S11 includes:

coating carbon nanotube dispersion on the substrate, and then drying the carbon nanotube dispersion by a drying process to form the carbon nanotube film layer; or first coating a curing material on the substrate, then preparing a carbon nanotube material on the curing material using a drawing film process, and finally curing the carbon nanotube material by a curing process corresponding to properties of the curing material to form the carbon nanotube film layer.

3. The manufacturing method of claim 1, wherein step S12 includes: placing the substrate subjected to step S11 in an environment of a strong oxidizing material, and doping and modifying the carbon nanotube film layer for a preset period of time at a preset temperature, wherein the strong oxidizing material includes nitrogen dioxide, bromine, nitric acid or thionyl chloride.

4. The manufacturing method of claim 1, wherein step S13 includes: patterning the carbon nanotube film layer by a laser ablation process.

5. The manufacturing method of claim 1, wherein after any of step S11, step S12, and step S13, the manufacturing method further includes: cleaning the substrate and then drying the substrate.

6. The manufacturing method of claim 1, wherein the material of the protection layer includes one or more of a polymer mixture of poly 3,4-Ethylenedioxythiophene and Polystyrene sulfonate, poly(p-phenyl vinyl), Polythiophene, Polysilane, Triphenylmethane, Triarylamine, and Pyrazoline.

* * * * *